United States Patent [19]
Imai et al.

[11] Patent Number: 5,310,328
[45] Date of Patent: May 10, 1994

[54] GREEN TIRE FORMING APPARATUS

[75] Inventors: Hisashi Imai, Izumizaki; Shinji Hayase, Shirakawa; Shousaku Anzai, Shirakawa; Kenichi Masuda, Shirakawa; Masaaki Iimura, Tamagawa, all of Japan

[73] Assignee: Sumitomo Rubber Industries, Ltd., Hyogo, Japan

[21] Appl. No.: 861,878
[22] PCT Filed: Nov. 2, 1990
[86] PCT No.: PCT/JP90/01433
§ 371 Date: Jul. 29, 1992
§ 102(e) Date: Jul. 29, 1992
[87] PCT Pub. No.: WO92/07707
PCT Pub. Date: May 14, 1992

[51] Int. Cl.$^5$ .................. B29D 30/24; B29D 30/36
[52] U.S. Cl. ...................... 425/31; 156/415; 425/28.1
[58] Field of Search .............. 425/28.1, 31-33, 425/500; 156/415

[56] References Cited

U.S. PATENT DOCUMENTS

| | | | |
|---|---|---|---|
| 3,647,598 | 3/1972 | Gazuit | 156/415 |
| 3,833,324 | 9/1974 | Klopper et al. | 425/31 |
| 3,909,337 | 9/1975 | Yabe | 425/31 |
| 4,138,307 | 2/1979 | Rost | 156/415 |
| 4,151,035 | 4/1979 | Jellison | 156/415 |
| 4,206,010 | 6/1980 | Gutknecht | 156/415 |
| 4,312,696 | 1/1982 | Bryant | 156/415 |
| 4,402,783 | 9/1983 | Enders | 156/415 |

FOREIGN PATENT DOCUMENTS

| | | |
|---|---|---|
| 43-18601 | 8/1943 | Japan . |
| 55-57448 | 4/1980 | Japan . |
| 58-122845 | 7/1983 | Japan . |
| 62-212135 | 9/1987 | Japan 156/415 |
| 422209 | 5/1989 | U.S.S.R. 156/415 |
| 1521609 | 11/1989 | U.S.S.R. 156/415 |

Primary Examiner—Jay H. Woo
Assistant Examiner—James P. Mackey

[57] ABSTRACT

A green tire forming apparatus has a driving section (2) and a forming section (1) supported by a shaft extended from the driving section (2). A center former section (10) of the forming section (1) has a pair of first former elements (11A), (11B) and a pair of second former elements (12A), (12B) arranged at the outside of the first former elements so as to be movable in an axial direction. The total width of the center former section can be shortened to about one fourth of the maximum. According to the apparatus, during green carcass formation, the width of the center former section (10) can be set as the required one, and during toroidal shaping, the width can be shortened to about one fourth of the maximum, whereby a distance (BW$_3$) between beads can be made close to that of a metal mold. As a result, generation of wrinkles during tire formation is largely decreased and tire quality can be improved.

14 Claims, 7 Drawing Sheets

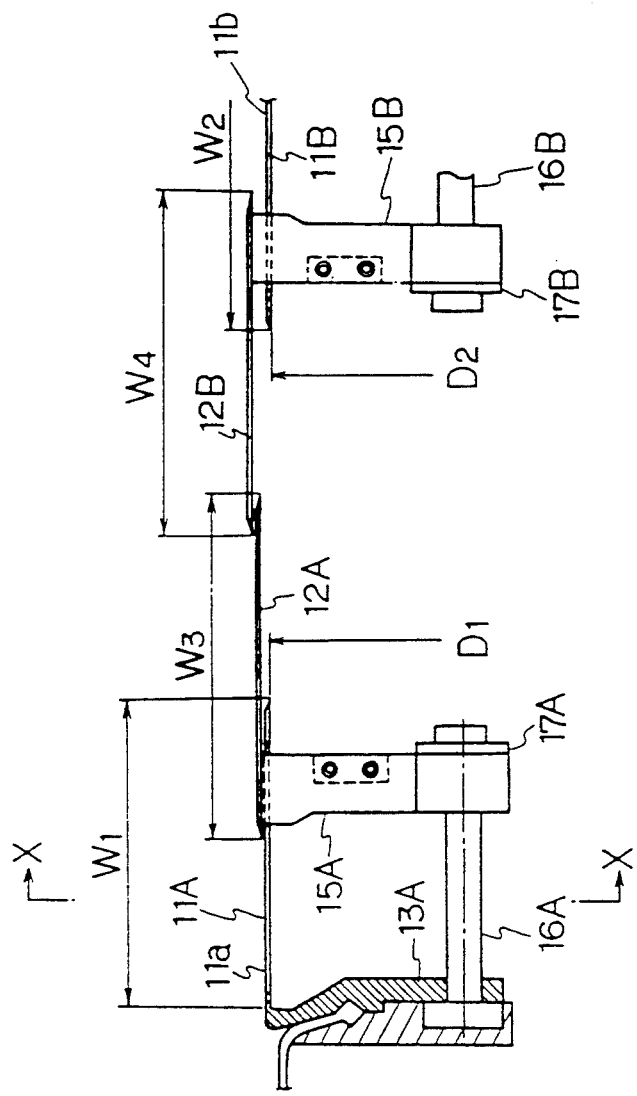
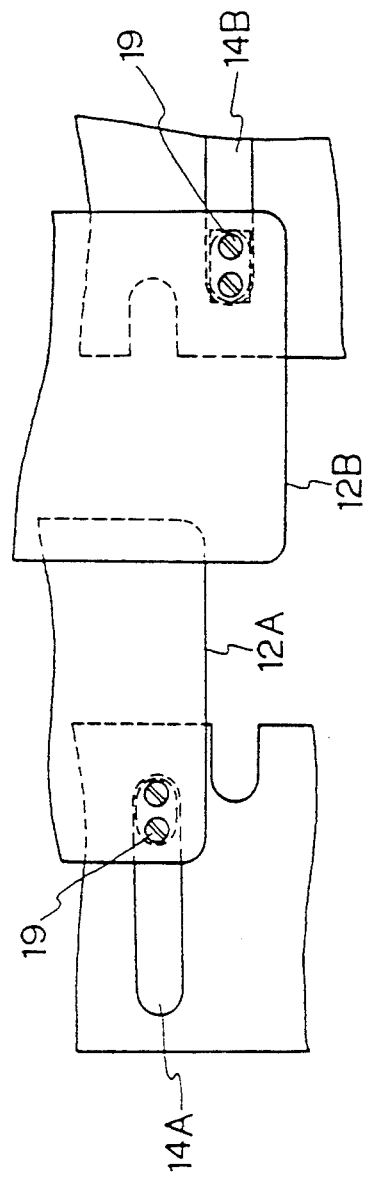
FIG. 2
FIG. 3

GREEN TIRE FORMING APPARATUS

TECHNICAL FIELD

The present invention relates to an improvement of a green tire forming apparatus, and more particularly relates to an improvement of a green tire forming apparatus employed in so-called single stage forming.

BACKGROUND ART

Conventionally, a tire forming apparatus employed in a single stage forming uses a single forming apparatus comprising a pair of right and left shoulder former sections and a central former section. Each of the shoulder former actions has a bead lock mechanism, and supports a shrunk ply turn-up bladder from inside by a cylindrical member to form a firm surface. The shoulder former sections are movable toward or away from to each other, namely, movable simultaneously in reverse directions along one axis. A tire component, such as ply, is wound around the outer circumference of the former sections to form a green carcass and a pair of right and left beads which are locked by bead lock mechanisms. Then, air is fed into the green carcass with the shoulder former sections being moved in toward each other in synchronization, to shape the green carcass toroidally and integrate it with a tread—belt assembly. Thereafter, both sides of the green carcass and side walls are wound up around the beads, whereby the green tire forming is accomplished. Such a tire forming apparatus is a so-called rubber former in which a flexible and expansible bladder is employed as the central, former section. So, there is a problem that an open joint is generated because when a tire component such as a ply is wound around the outer circumference of the former, jointing work is difficult to carry out. Accordingly, instead of the rubber former, a two-stage-overlapping-type forming apparatus was developed. In the apparatus, as shown in FIG. 7, each end of a pair of, right and left, cylindrical members 22A, 22B having hard surface which overlap over a full width with each other are fixed, concentrically with the sections 21A, 21B, to inner side surface of each shoulder former sections 21A, 21B to construct the center former section 23. When both former sections 21A, 21B are moved to remotest positions, both (right and left) cylindrical members 22A, 22B provide a predetermined necessary former width FW for forming a green carass. When both former sections 21A, 21B are moved toward one another for toroidally shaping the green carcass, both cylindrical members 22A, 22B overlap over a full width with each other. Namely, the members 22A, 22B are superimposed into a two layer unit (as shown in FIG. 7 by dotted lines) to shorten the former width FW into about a half width.

However, when a tire is formed with the two-stage-overlapping-type apparatus, the minimum distance at shaping both shoulder former sections 21A, 21B, in other words, the distance $BW_1$ between the beads in the completed green tire after shaping is, as shown in FIG. 8, inevitably limited to a half width of hard cylindrical elements 22A, 22B which regulate the former width FW (in FIG. 7). On the other hand, since the distance between the beads $BW_2$ of a tire cured by a curing metal mold is much shorter than the distance $BW_1$ between the beads of the green tire, the beads 25A, 25B are forcibly much moved inwardly toward each other during cure. As a result, undesirable wrinkles are generated on bead chafers and side walls, so that defective tires are produced. The object of the present invention is to solve such problem.

In FIG. 8, the solid line shows a carcass profile of a green tire made by the two-stage-overlapping-type forming apparatus, the one-dot chain line shows a carcass profile of a tire cured by a metal mold, and the dashed line shows a carcass profile of a green tire made by an apparatus of the present invention disclosed below. Numeral 29 represents a tread.

DISCLOSURE OF THE INVENTION

The present invention relates to a green tire forming apparatus comprising a driving section 2 and forming section 1. The green tire forming apparatus comprises a driving section 2 and a forming section 1 supported by a shaft extended from the driving section 2, and is characterized in that a center former section 10 of the forming section 1 comprises a pair of first forming elements 11A, 11B and a pair of second forming elements 12A, 12B arranged outside of the first elements so as to be movable in an axial direction, and the first and the second former elements can be overlapped with one another over the whole width of the elements into a four layered unit. More particularly, the present invention relates to a green tire forming apparatus characterized in that (1) the driving section comprises a shaft element and a driving mechanism; wherein
   (a) the shaft element comprises a main shaft and a sleeve slidably encasing the main shaft, and the main shaft and the sleeve respectively have an end extended from the driving section, and
   (b) the driving mechanism has a mechanism which moves simultaneously the main shaft and the sleeve reversely to each other;

(2) the forming section comprises a pair of shoulder former sections and a center former section; wherein
   (a) one of the shoulder former sections is attached to one end of the main shaft extended from the driving section, and the other of the shoulder former sections is attached to one end of the sleeve extended from the driving section,
   (b) the center former section comprises a pair of first former elements and a pair of second former elements slidably supported by the first former elements, and the first and the second former elements can be overlapped one another over whole width, so that the width of the center former section can be shortened to about one fourth of the maximum, and
   (c) each end portion of the first forming elements is supported by an adjacent end portion of the shoulder former sections.

In the green tire forming apparatus, when the right and left shoulder former sections are moved to the remotest positions, a hard cylindrical surface of predetermined necessary former width for forming a green carcass is formed with the first and the second former elements, and when the right and the left shoulder former sections are moved to the nearest positions, the first and the second elements are overlapped one another over the whole width into a four layered unit so that the former width is shortened into about one fourth to enable toroidal shaping of green carcass.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a partially sectional view of a tire forming section of an embodiment of the present invention;

FIG. 3 is a partial plan view of FIG. 2;

DETAILED DESCRIPTION OF THE PREFERRED EMBODIMENTS

An embodiment of the present invention is described below in detail with reference to the accompanied drawings.

Figure 1:
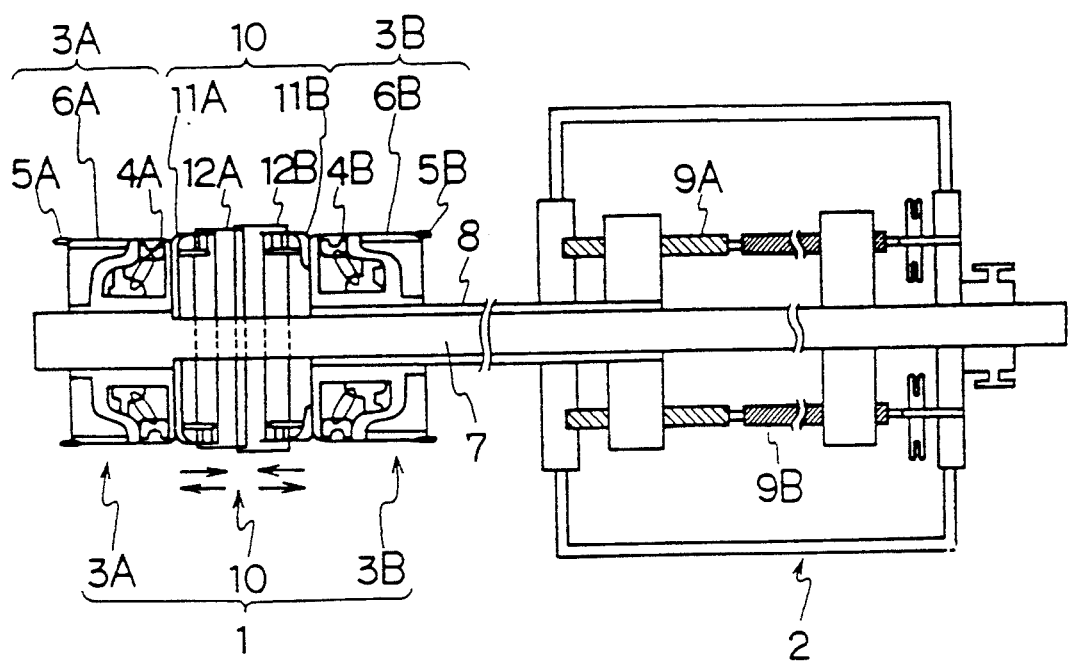
FIG. 1 is a plan view showing a tire forming section and a driving section therefor of the present invention.

In FIG. 1, numeral 1 represents a green tire forming section and numeral 2 represents a supporting and driving section thereof (hereinafter simply referred to as a driving section).

A pair of, right and left, shoulder former sections 3A, 3B enclose bead lock mechanisms 4A, 4B which are moved up and down through links by air cylinders, and hard cylindrical surface is formed by supporting shrunk ply turn-over bladders 5A, 5B from inside thereof with cylindrical elements 6A, 6B. The shoulder former section 3A is supported by one end of a main shaft 7, and the shoulder former section 3B is supported by one end of a sleeve 8. The shoulder former sections are movable along the same axis both toward and away from each other as shown by arrows, namely, movable simultaneously in reverse directions by means of a driving mechanism comprising to rods 9A, 9B each having right handed threads and left handed threads, and a motor (not shown) rotating the rods.

Figure 4:
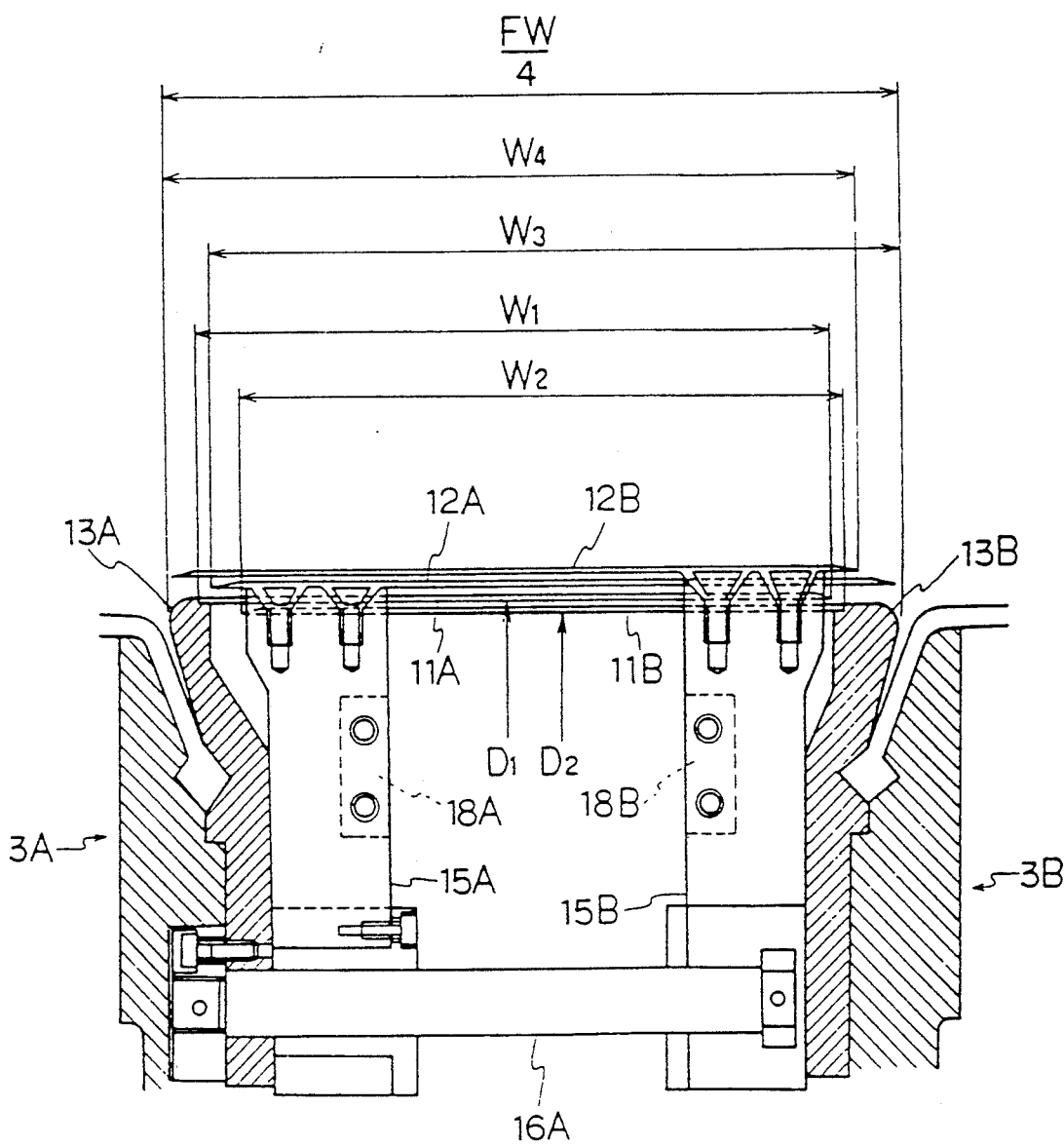
FIG. 4 is a sectional view showing the forming section of an embodiment of the present invention in a condition where their width is shortened into about one fourth.
Figure 5:
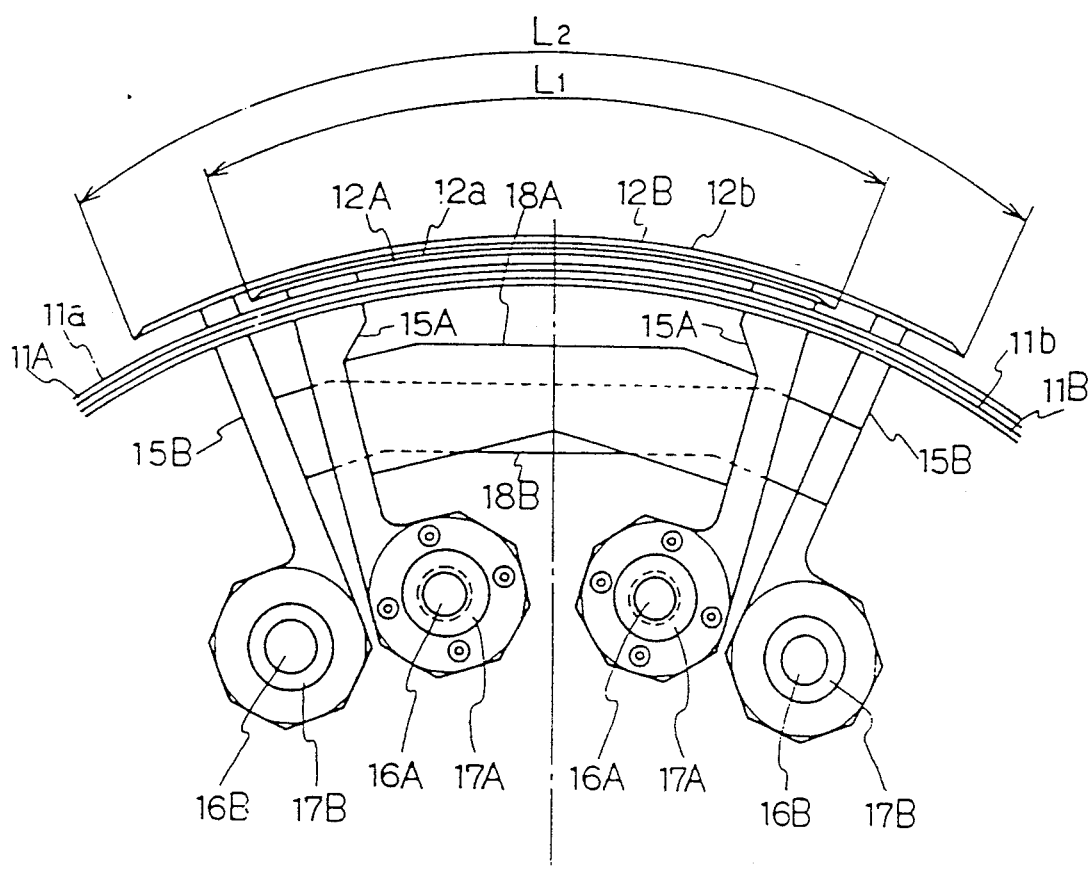
FIG. 5 is a sectional view taken along the line X—X of FIG. 2.

The center former section 10 comprises a pair of, right and left, first former elements 11A, 11B and a pair of, right and left, second former elements 12A, 12B. As shown in FIGS. 2 to 4, the first former elements 11A, 11B are cylindrical bodies comprising hard cylindrical surfaces 11a, 11b and flanges 13A, 13B, and each end of the elements 11A, 11B is removably and coaxially attached to the inside of the shoulder former sections 3A, 3B respectively. The first former elements 11A, 11B have almost the same width $W_1$, $W_2$ and slightly different diameter $D_1$, $D_2$ to each other, so that the right and the left first former elements can be overlapped to each other over their whole width $W_1$, $W_2$ as shown in FIG. 4 when the shoulder former sections 3A, 3B are moved to the nearest positions. As shown in FIG. 5, the second former elements 12A, 12B are former segments comprising, hard cylindrical surfaces 12a, 12b of which centers coincide with those of the first former elements 11A, 11B. The former segments have almost the same width $W_3$, $W_4$ and different circular length $L_1$, $L_2$. The former segments 12A, 12B respectively have elongated holes 14A, 14B in an axial direction. The former segments 12A, 12B are cantilevered respectively by arms 15A, 15B projected from the cylindrical surface 11a, 11b of the first former elements 11A, 11B through the elongated holes 14A, 14B. The arms 15A, 15B are slidably supported by guide rods 16A, 16B respectively through bearing portions 17A, 17B, and are connected by reinforcements 18A, 18B. The guide rods 16A, 16B are projected from the shoulder former sections 3A, 3B in an axial direction. In FIGS. 2 to 4, numeral 19 represents a bolt for fixing the second former elements 12A, 12B to the arms 15A, 15B.

Accordingly, the former segments 12A, 12B are movable on the cylindrical surfaces 11a, 11b of the first former elements 11A, 11B along the elongated holes 14A, 14B in the axial direction. Thereby the former segments 12A, 12B can be overlapped over their full width $W_3$, $W_4$ when the shoulder former sections 3A, 3B are moved to the nearest positions.

In another embodiment, in place of the former segments 12A, 12B as shown in FIG. 1, cylinders of almost the same width having hard cylindrical surfaces and having axes coinciding with those of the first former elements 11A, 11B might be employed. If the cylinders are employed as the second former elements 12A, 12B, at least two pairs of elongated holes extending in the axial direction are provided opposite to each other so that each cylinder is supported at least in two points by each end of a pair of arms projected from the cylindrical surfaces of the first former elements through the elongated holes.

Figure 6:
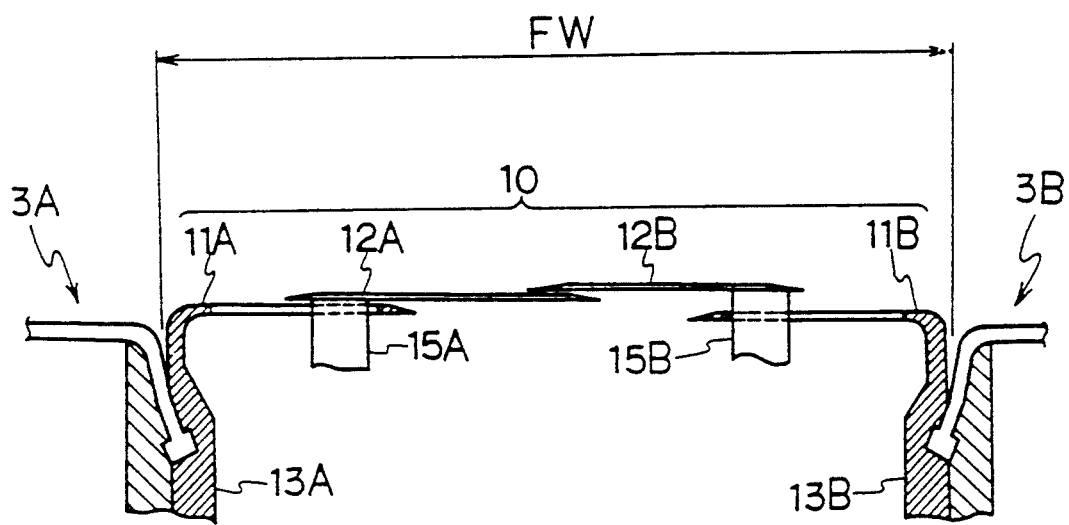
FIG. 6 is a partially sectional view showing the forming section of the present invention in a condition where their width is extended into a predetermined necessary forming one.
Figure 7:
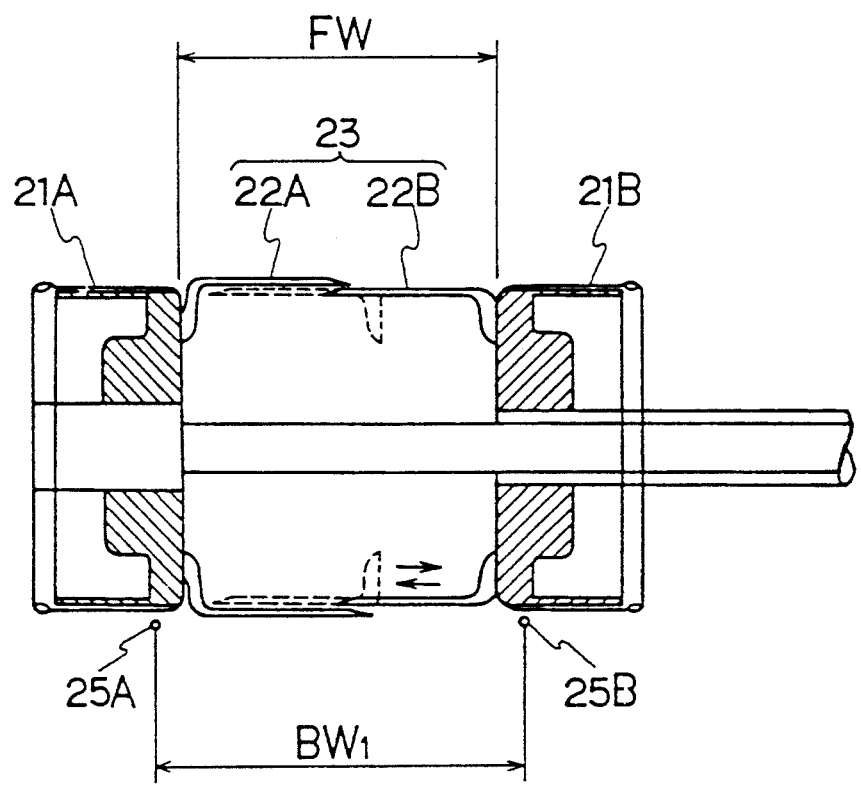
FIG. 7 is a sectional view of a conventional two-stage-overlapping-type tire forming apparatus.

When the right and the left shoulder former sections 3A, 3B are moved to the remotest positions, a hard cylindrical surface is formed, as shown in FIG. 6, with the right and the left first former elements 11A, 11B and the right and the left second former elements 12A, 12B, if a worker moves the right and the left second former elements 12A, 12B to the limit in an opposite direction along the elongated holes of the first former elements. The center former section 10 is formed in this manner and the hard cylindrical surface thereof has a predetermined former width FW required for green carcass shaping. When both shoulder former sections 3A, 3B are moved to the nearest positions for toroidal shaping of the green cercass, the right and the left first former elements 11A, 11B and the right and the left second former elements 12A, 12B are overlapped with one another over the whole width thereof, as shown in FIG. 4, to shorten the former width FW to about one fourth.

INDUSTRIAL APPLICABILITY

Figure 8:
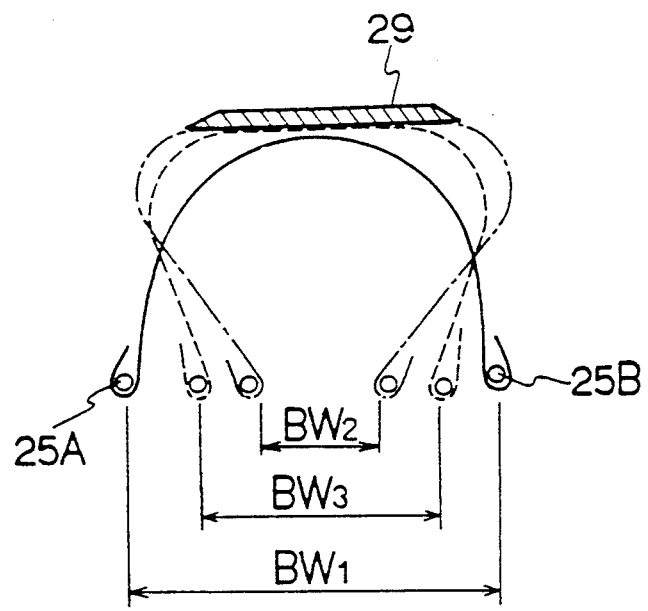
FIG. 8 is a explanatory illustration showing respective distances between the beads obtained by a conventional two-stage-overlapping-type tire forming apparatus, by a tire forming apparatus of the present invention, and by curing with a metal mold.

According to the present invention, as mentioned above, a required forming width is obtained during the green carcass shaping, and the forming width is shortened to about one fourth during the toroidal shaping, so that the bead distance $BW_3$ obtained by a four-stage-overlapping-type former of the present invention is closer to the bead distance $BW_2$ obtained by a metal mold for curing than the bead distance $BW_1$ obtained by a conventional two-stage-overlapping-type former, as shown in FIG. 8. As a result, a distance that the beads 25A, 25B move inwardly during cure decreases so that an efficient practical effect is obtained, that is, undesired defects such as wrinkles on the bead chafer or side wall are largely decreased and the tire quality increases.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A green tire forming apparatus comprising a driving section and a forming section supported by a shaft extended from the driving section wherein a center former section of the forming section comprises a pair of first former elements and a pair of second former elements, the pair of first former elements being simultaneously movable in opposed directions and the pair of second former elements being simultaneously movable in opposed directions, each one of the pair of first elements being adjacent one of the pair of second elements, adjacent first and second formed elements moving in a first direction while the other adjacent first and second former elements move in a second direction, the first and second directions being opposite directions, and the first and second former elements overlap for substantially a whole width of the elements when movement to a first position is complete, the pair of first and second former units thereby forming a four layered unit.

2. The green tire forming apparatus according to claim 1, wherein
   (1) the driving section comprises the shaft and a driving mechanism; wherein
      (a) the shaft comprises a main shaft and a sleeve slidably encasing the main shaft, and the main shaft and the sleeve respectively each have an end extended from the driving section, and
      (b) the driving mechanism has a mechanism which moves simultaneously the main shaft and the sleeve in the opposed first and second directions;
   (2) the forming section comprises a pair of shoulder former sections and the center former section; wherein
      (a) one of the shoulder former sections is attached to said one end of the main shaft extended from the driving section, and the other of the shoulder former sections is attached to said one end of the sleeve extended from the driving section,
      (b) the center former section comprises the pair of first former elements and the pair of second former elements supported by the first former elements so as to be slidable in the first and second directions, and the first and second former elements overlap one another, so that the width of the center former section is shortened to about one fourth of the maximum width when movement of the former elements to the first position is completed, and
      (c) each first former element and shoulder former section having an end portion with the end portions of the first former elements being supported by adjacent end portions of the shoulder former sections.

3. The green tire forming apparatus according to claim 1 or 2, wherein each of the second former elements is a cylinder.

4. The green tire forming apparatus according to claim 1 or 2, wherein each of the second former elements is at least one former segment.

5. The green tire forming apparatus according to claim 1, wherein the center former section is disposed about a central axis and wherein the first and second directions are generally parallel to the central axis.

6. The green tire forming apparatus according to claim 1, wherein each of the second former elements only partially overlap the adjacent first former element when movement to a second position is completed, the former elements being movable between the first and second positions.

7. The green tire forming apparatus according to claim 6, wherein the first and second positions are movement end points for the former elements.

8. The green tire forming apparatus according to claim 6, wherein the center former section has a minimum width when the first and second former elements are in the first position and are overlapped to form the four layered unit and wherein the center former section has a maximum width when the first and second former elements are in the second position.

9. The green tire forming apparatus according to claim 1, wherein the second former elements each have first and second ends, the green tire forming apparatus further comprises one arm for supporting each of the second former elements, the arms being connected adjacent the first ends of the second former elements and wherein the second end of one of the second former elements is generally unsupported.

10. The green tire forming apparatus according to claim 9, wherein each first former element has at least one opening defined therein and wherein each of the openings has one of the arms passing therethrough.

11. The green tire forming apparatus according to claim 9, wherein the center former section has a minimum width when the first and second former elements are in the first position and are overlapped to form the four layered unit, the minimum width of the center formed section being about one fourth of the maximum width thereof.

12. The green tire forming apparatus according to claim 1, wherein the center former section has a minimum width when the first and second former elements are in the first position and are overlapped to form the four layered unit.

13. The green tire forming apparatus according to claim 12, wherein the minimum width of the center former section is about one fourth of the maximum width thereof.

14. The green tire forming apparatus according to claim 1, wherein only one four layered unit is formed by the two pairs of former elements.

* * * * *